US008797206B2

(12) United States Patent
Uysal et al.

(10) Patent No.: US 8,797,206 B2
(45) Date of Patent: Aug. 5, 2014

(54) METHOD AND APPARATUS FOR SIMULTANEOUS MULTI-MODE PROCESSING PERFORMING TARGET DETECTION AND TRACKING USING ALONG TRACK INTERFEROMETRY (ATI) AND SPACE-TIME ADAPTIVE PROCESSING (STAP)

(75) Inventors: Faruk Uysal, Ridgefield Park, NJ (US); Vinay Mudinoor Murthy, Elmont, NY (US); Unnikrishna Sreedharan Pillai, Harrington Park, NJ (US)

(73) Assignee: C & P Technologies, Inc., Closter, NJ (US)

( * ) Notice: Subject to any disclaimer, the term of this patent is extended or adjusted under 35 U.S.C. 154(b) by 282 days.

(21) Appl. No.: 13/495,639

(22) Filed: Jun. 13, 2012

(65) Prior Publication Data
US 2014/0191900 A1    Jul. 10, 2014

(51) Int. Cl.
*G01S 13/90*    (2006.01)
(52) U.S. Cl.
CPC ............. *G01S 13/9029* (2013.01); *G01S 13/90* (2013.01)
USPC ...................................... 342/25 B; 342/25 F
(58) Field of Classification Search
USPC ...................................................... 342/25 B
See application file for complete search history.

(56) References Cited

PUBLICATIONS

Davis, M.E., "L-band SBR moving target detection in SAR-GMTI modes," Aerospace Conference, 2004. Proceedings. 2004 IEEE , vol. 4, pp. 2211-2219. Mar. 6-13, 2004. doi: 10.1109/AERO.2004. 1368014.*

Hale, T.B.; Temple, M.A.; Wicks, M.C., "Clutter suppression using elevation interferometry fused with space-time adaptive processing," Electronics Letters, vol. 37, No. 12, pp. 793-794. Jun. 7, 2001. doi: 10.1049/el:20010494.*
Paul A. Rosen, Jet Propulsion Laboratory, Sep. 19, 2004, IGARSS 04 Tutorials, twenty pages.
J. R. Guerci, "Space-Time Adaptive Processing for Radar",Artech House, pp. 111-115, date: 2003.
S. U. Pillai, K. Y. Li, and B. Himed, "Space Based Radar: Theory & Applications", McGraw Hill, Dec. 2007, inside cover page and pp. 152-161.
Fienup, J. R., "Detecting moving targets in SAR imagery by focusing", IEEE Transactions on Aerospace and Electronic Systems, vol. 37, No. 3, Jul. 2001 , pp. 794-809.
Ian G. Cumming and Frank H. Wong. "Digital Processing of Synthetic Aperture Radar Data: Algorithms and Implementation". Artech House Publishers, Jan. 2005, inside cover page, and pp. 6-7.
L. A. Gorham and L. J. Moore., "SAR image formation toolbox for MATLAB", In Algorithms for Synthetic Aperture Radar Imagery XVII 669, 2010; thirteen pages.
"Along Track Interferometry Synthetic Aperture Radar (ATI-SAR) Techniques for Ground Moving Target Detection." Final Technical Report AFRL-SN-RS-TR-2005-410, Jan. 2006, 62 pgs.
R.M. Kapfer and M.E. Davis, "Ultra-Wideband Multi-Mode Radar Processing", Proceedings of the 2012 IEEE Radar Conference, Atlanta, GA. May 7-11, 2012, pp. 95-100.

* cited by examiner

*Primary Examiner* — Matthew M Barker
(74) *Attorney, Agent, or Firm* — Walter J. Tencza, Jr.

(57) ABSTRACT

The present invention discloses one or more methods to perform multimode processing using a single set of measured data in a multi-sensor fusion framework. In this context, various data processing methodologies are combined in parallel in a suitable manner to simultaneously image, detect, identify and track moving targets over clutter such as stationary background using data obtained from a single set of measurements. Traditionally multiple sets of data would be required to perform these tasks, furthermore the disparate datum would be processed independently of one another. By using a common data source and interconnected processors the information content of the measured data can be fully exploited and leveraged to provide actionable intelligence and aid logistics.

22 Claims, 8 Drawing Sheets

METHOD AND APPARATUS FOR SIMULTANEOUS MULTI-MODE PROCESSING PERFORMING TARGET DETECTION AND TRACKING USING ALONG TRACK INTERFEROMETRY (ATI) AND SPACE-TIME ADAPTIVE PROCESSING (STAP)

STATEMENT REGARDING FEDERALLY SPONSORED RESEARCH OR DEVELOPMENT

The present invention is based upon work supported and/or sponsored by the Information Innovation Office, Defense Advanced Research Project Agency (DARPA), Arlington, Va., under SBIR Phase II contract No. D11PC20007.

FIELD OF THE INVENTION

This invention relates to improved methods for target detection and tracking using radar data from platforms capable of performing simultaneous synthetic aperture radar (SAR), along-track interferometry (ATI) and beamforming.

BACKGROUND OF THE INVENTION

Remote sensing radar has been under development for the past several decades. It has provided a means for long-range continuous all-weather day/night observational capabilities that were not previously available. We now have the ability to perform long-distance ranging, observe large-scale weather patterns, construct digital elevation maps, measure significant changes in the earth's surface, map mineral distributions, detect moving targets and even construct images using measured radar echoes and sophisticated modern processing.

Space Time Adaptive Processing (STAP) is a well-known method used to process spatio-temporal data to detect moving targets by employing a whitening operation followed by matched filtering in the spatio-temporal domian (J. Ward, *Space-time adaptive processing for airborne radar*. MIT Lincoln Laboratory, Technical Report 1015, December 1994; J. R. Guerci, *Space-Time Adaptive Processing for Radar*. Artech House; S. U. Pillai, K. Y. Li, and B. Himed, *Space Based Radar: Theory & Applications*. McGraw Hill Professional, December 2007.). SAR imaging was invented in the 1950s and has since been under continuous development. It is capable of imaging large swathes of terrain and all manners of objects visible to instruments operating in the RF spectrum. Moving target indication (MTI) such as air MTI (AMTI) and ground MTI (GMTI) are heavily used in both the military and civilian sectors for monitoring air and ground traffic. MTI radars are widely used for discrete surveillance and monitoring of sensitive areas. ATI is a well-known technique based on SAR images obtained from two phase centers separated by some distance in the along-track dimension (P. A. Rosen, *Principles and Theory of Radar Interferometry*, Tutorial for IGARSS, JPL Sep. 19, 2004). The advantage provided by ATI over SAR imaging alone is that by correlating the images from two different phase centers, the clutter scene (stationary background) is cancelled out and only moving targets are emphasized. ATI along with STAP has been used for estimating the velocities of both endoclutter and exoclutter targets. Slow-moving targets that are within the Doppler ridge generated by the platform are referred to as being in endoclutter while targets that are external to the Doppler ridge are referred to as being in exoclutter. ATI has an advantage over STAP when estimating the velocity of targets in endoclutter whereas STAP is more efficient at detecting targets in exoclutter.

SUMMARY OF THE INVENTION

Target detection and tracking is a key asset to obtaining complete situational awareness. The capability to continuously monitor all vehicles within a given scenario yielding a stream of actionable information is critical to achieving superiority in tactical scenarios. To this end we integrate along-track interferometry (ATI) and space-time adaptive processing (STAP) together with synthetic aperture radar (SAR) imaging in order to detect the presence of, and track moving targets over a long synthetic aperture using subaperture processing.

A useful target track should contain information gathered over a minimum of several seconds, ideally lasting a few minutes for online tracking in a tactical scenario. Over the duration of a large synthetic aperture spanning the required time duration for forming a useful target track we perform each of the three operations—SAR, ATI and STAP—over subapertures, or time windows that are a fraction of the overall tracking aperture, or tracking time window Of the three operations, SAR and ATI require more measured information for a single output than does STAP, and their coherent processing intervals (CPIs) are identical as the ATI output is obtained by first forming two or more SAR images from the data obtained during a particular subaperture or time window. The coherent processing interval (CPI) for SAR and ATI should be chosen to be sufficiently long such that enough information is collected in order to meet the required range and cross-range resolutions while remaining sufficiently short to ensure the target does not decohere to the point of invalidating results obtained during the subaperture or time window. Data obtained from a minimum of two phase centers displaced by some distance in the along-track dimension are required to form a basic interferogram from which the ATI output is to be obtained. ATI yields two useful outputs: the location of the target signature which is shifted from the target's physical location due to the aberrations caused by the target's motion, and an estimate for the target's velocity component along the line-of-sight between the platform and the target.

The CPI for STAP is much smaller than the CPI for SAR, being typically on the order of a few milliseconds, if not microseconds. Therefore over the course of a single subaperture it is possible to create many target velocity and angle estimates using STAP. In general a moving target has a range (slant-range or line-of-sight) and a cross-range (dimension perpendicular to range) velocity. The estimated velocity corresponds to the observed velocity along the slant-range between the platform and the target, and the estimated angle corresponds to the angle formed between the slant-range and the platform's look direction (which coincides with the normal perpendicular to the platform's path in the unsquinted case). It is sufficient to consider only two such estimates over a single subaperture provided they are sufficiently well spaced to obtain reliable estimates of the target's true velocity and heading.

Once the ATI and STAP outputs have been obtained they can be combined to estimate the physical origin of the target over the aperture under consideration using knowledge derived from conventional SAR theory. Target motion induces quantifiable and predictable aberrations, namely range and cross-range shifts of the target's signature from the target's physical location and a smearing in the cross-range dimension (Fienup, J. R. (2001). *Detecting moving targets in SAR imagery by focusing*. IEEE Transactions on Aerospace and Electronic Systems 2001). The former is due to the target's range velocity and the latter are due to the target's cross-range velocity. This process is performed at every subaperture along the entire tracking aperture forming a chain of estimates that can be fed into the target tracker, which in turn produces the estimated target track.

It is an object of one or more embodiments of the present invention to perform multimode processing using a single set of measured data in a multi-sensor fusion framework. In one or more embodiments of the present invention, several data processing methodologies are combined in parallel to simultaneously image, detect, identify and track moving targets over clutter (stationary background) using data obtained from a single set of measurements. Traditionally multiple sets of data would be required to perform these tasks, furthermore the disparate datum would be processed independently of one another. By using a common data source and interconnected processors the information content of the measured data can be fully exploited and leveraged to provide actionable intelligence and aid logistics.

One or more embodiments of the present invention provide a method including transmitting a signal in the form of pulses from a moving platform towards a plurality of targets during a duration. The method may also include receiving at first and second receiver devices first and second sets of pulse returns back from the plurality of targets in response to the signal, wherein the first and the second receiver devices are fixed to the moving platform.

The method may further include determining a first subset of the first set of pulse returns, determining a first subset of the second set of pulse returns, determining a second subset of the first set of pulse returns, and determining a second subset of the second set of pulse returns. The method may further include subjecting the second subset of the first set of pulse returns to a synthetic aperture radar imaging process to form a first set of a first modified plurality of data items; and subjecting the second subset of the second set of pulse returns to a synthetic aperture radar imaging process to form a second set of a first modified plurality of data items.

The method may further include subjecting the combination of the first set and second set of the first modified plurality of data items to an along track interferometry process to form data for an image; subjecting the first subset of the first set of pulse returns to a space time adaptive processing to form a first set of a second modified plurality of data items; and subjecting the first subset of the second set of pulse returns to a space time adaptive processing to form a second set of a second modified plurality of data items.

The method may also include combining the data for the image and the first and the second sets of second modified plurality of data items to determine a plurality of positions one for each of the plurality of targets; and marking the plurality of positions, for each of the plurality of targets, on a map.

Each of the first and the second receiver device may include a plurality of sensors. Any number of further receiver devices, in addition to the first and the second receiver device may be provided.

The plurality of positions, for each of the plurality of targets, may be marked sequentially on a map to identify a track for each of the plurality of targets.

The moving platform may be fixed to, for example, an airborne vehicle. an underwater submerged vehicle, or a space based vehicle. Each of the plurality of moving targets may be ground based, air based, underwater based, of space based.

The first set of pulse returns may be received by the first receiver device at substantially the same time that the second set of pulse returns are received by the second receiver device.

One or more embodiments may also provide an apparatus which may include a transmitter/receiver including a transmitter, a first receiver device, and a second receiver device, a computer processor, and a computer memory. The computer processor may be programmed by computer software stored in the computer memory to cause the implementation of one, more than one, or all of the method steps previously described. The computer processor may be programmed by computer software store in computer memory to store data and/or display on a computer display results from any of the method steps previously described.

DETAILED DESCRIPTION OF THE DRAWINGS

Figure 1:
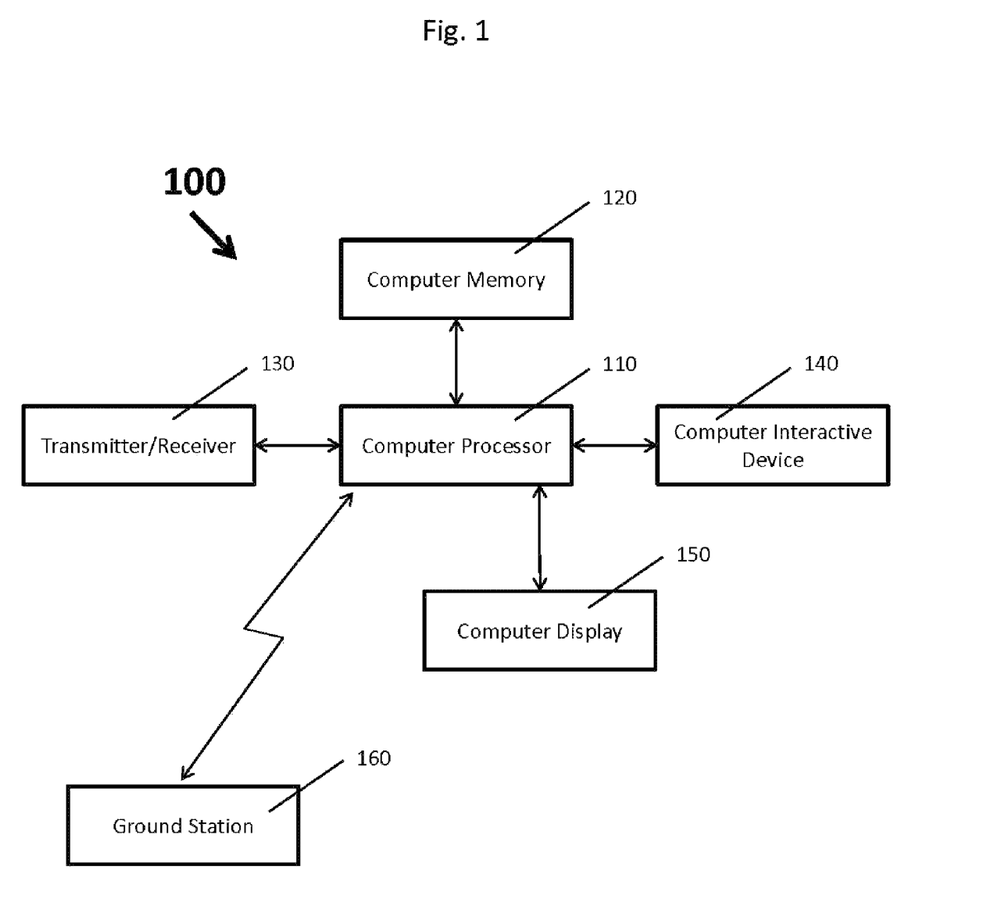
FIG. 1 shows a block diagram of an onboard apparatus and a ground station in accordance with an embodiment of the present invention, wherein the onboard apparatus may be located in a handheld device, which may communicate with the ground station.

FIG. 1 shows a block diagram of an apparatus 100 in accordance with an embodiment of the present invention and of a ground station 160 to which the apparatus 100 communicates. The apparatus 100 includes a computer memory 120, a computer processor 110, a transmitter/receiver 130, a computer interactive device 140, a computer display 150. The transmitter/receiver 130 may include a transmitter, a first receiver device, and a second receiver device, and any further number of receiver devices. Each receiver device of the transmitter/receiver 130 may be spaced apart from every other receiver device of the transmitter/receiver 130. The apparatus 100 may communicate with the ground station 160 through a data link in order to relay the data measured by the transmitter/receiver 130 or data processed by the on-board processor 110. The data link may be implemented by a transmitter/receiver such as 130 or by another transmitter/receiver of by some other mechanism such as a tactical data link system. The computer memory 120, the transmitter/receiver 130, the computer interactive device 140, the computer display 150 and the ground station 160 may communicate with and may be connected by communications links to the computer processor 110, such as by hardwired, wireless, optical, and/or any other communications links. The apparatus 100 may be part of or may be installed on any computer, such as a personal computer, a handheld portable computer device, such as a tablet computer, laptop computer, or portable smart phone.

The transmitter/receiver 130 may be a radar or transmitter/receiver or a plurality of radio frequency transmitter/receivers.

Figure 2:
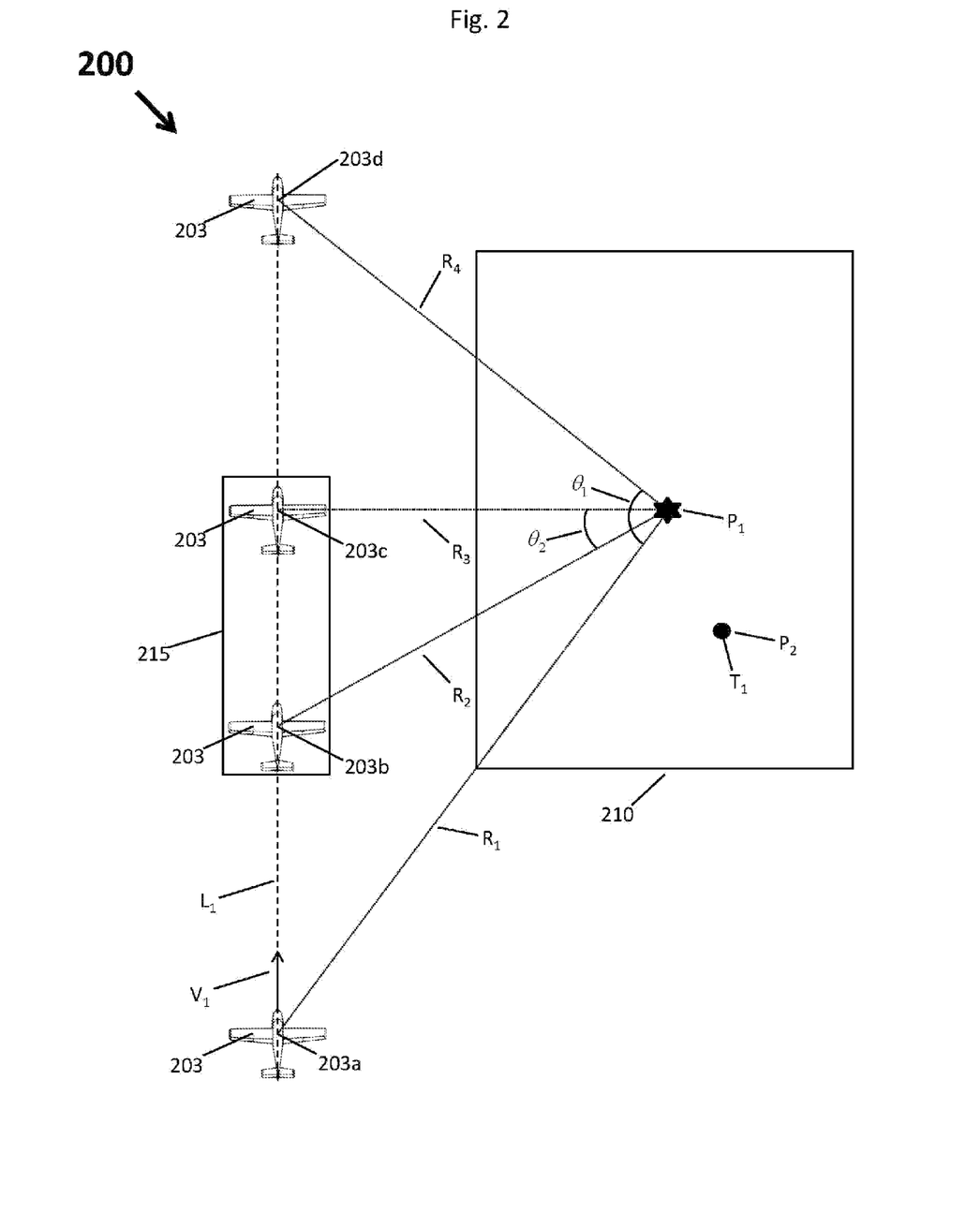
FIG. 2 illustrates measurement geometry for strip mapmode SAR/GMTI with a flight path of an aircraft vehicle to the left, and an observation scene with a target to the right.

FIG. 2 illustrates a diagram 200. The diagram 200 shows an aircraft, airborne vehicle, or airplane 203, at a plurality of different locations to depict the flight of the airplane 203. The airplane 203 is shown at locations 203a, 203b, 203c, and 203d in FIG. 2, at four different instances of time as the airplane 203 flies along a path $L_1$. The airplane 203 files through a space, area, time window or aperture, or subaperture 215 which may be a SAR/ATI/STAP subaperture.

A slant range $R_1$ or distance leading from a transmitter/receiver, such as transmitter/receiver 130, on the airplane 203 when the airplane 203 is at the location 203a to a point, location, or aim point (scene center) $P_1$, location identified by a star, is shown in FIG. 2. A slant range or distance $R_2$ leading from the transmitter/receiver 130 on the airplane 203 when the airplane 203 is at the location 203b to the scene center or point $P_1$ is also shown in FIG. 2. A slant range or distance $R_3$ leading from the transmitter/receiver 130 on the airplane 203 when the airplane 203 is at the location 203c to the scene center or point $P_1$ is also shown in FIG. 2. A slant range or distance $R_4$ leading from the transmitter/receiver 130 on the airplane 203 when the airplane 203 is at the location 203d to the scene center or point $P_1$ is also shown in FIG. 2. A dashed line along which the slant range $R_1$ is measured makes an angle of $\theta_1$ with a dashed line along which the slant range $R_4$ is measured. A line along which the slant range $R_2$ is measured makes an angle of $\theta_2$ with a dashed line along which the slant range $R_3$ is measured.

FIG. 2 also shows a scene 210 on the surfaces of the Earth being measured by the SAR/GMTI platform or transmitter/receiver 130 with an aim point, which is the scene center or point $P_1$ and an ideal point target or point $P_2$ which is located in the scene 210. $P_1$ is also the scene center for this particular example. An aim point may be chosen which is different from the scene center $P_1$.

The diagram 200 depicts SAR/GMTI data measurement geometry for a side looking stripmap-mode SAR/GMTI system. Here a specific case is illustrated while in practice the data may also be collected by the computer processor 110 through transmitter/receiver 130 or through multiple receivers of multiple radar transmitter/receivers in one of many different geometries including spotlight, scan, and circular modes. (M. Soumekh, *Synthetic Aperture Radar Signal Processing with Matlab Algorithms*, Wiley, 1999; Ian G. Cumming and Frank H. Wong. *Digital Processing of Synthetic Aperture Radar Data: Algorithms and Implementation*. Artech House Publishers, January 2005.). In general, a measurement platform, on which transmitter/receiver 130 may be located may be terrestrial, airborne, aquatic or space-based. For stripmap imaging, the measurement platform, such as transmitter/receiver 130, may be located on the airplane 203 and may move from the start location 203a along the path $L_1$ parallel to the scene being imaged 210 at a constant velocity vector $V_1$, to its final location 203d covering an integration angle $\theta_1$ between the lines along which $R_1$ and $R_4$ are measured. The quantity $R_1$ from the transmitter/receiver 130 on the airplane 203, while airplane 203 is at location 203a to the scene center location $P_1$ may be called the slant range $R_1$ R(t) for the stripmap geometry and in at least one embodiment is given by:

$$R(t)=\sqrt{(R_0+x_0)^2+(y_0+V_p t)^2+H^2}. \quad (1)$$

where $R_0$ is the minimum range imaged, $(x_0,y_0)$ are the coordinates of the scene center $P_1$ (when the scene center is at a zero altitude, i.e. located on the earth's surface) relative to $R_0$ and H is altitude (with respect to a reference level, usually mean sea level or geoid) of the transmitter/receiver 130. The altitude of any point inside the scene 210 is assumed to be zero for this particular example. In a real application a digital elevation map (DEM) may be used by the computer processor 110 or by a computer processor of the ground station 160 to determine the altitudes of the points in the scene 210. So the coordinates of the scene center $P_1$ may be written as $(x_0, y_0, z_0)$, with $z_0$ being the altitude or height of the scene center relative to the earth's surface An ideal point target $P_2$ is shown slightly below and to the right of the scene center; It could be the aim point $P_1$ which is at the center of the scene 210 and has coordinates $(x_0, y_0)$ (when the aim point has a zero altitude relative to the reference level) or may be any other point in the scene 210.

The SAR/ATI/STAP subaperture 215 in FIG. 2 covers an angle of $\theta_2$ measured from the mid-point of the two phase centers 420 and 430 on the platform from start position 203b to end position 203c. At least two phase centers (sensors or sensor groups) are needed for ATI processing. In FIG. 2, subaperture 215 refers to the region that covers the active phase centers and it may not include other parts of the airplane such as its tail or nose.

The dashed line along which the slant range $R_2$ is measured from the transmitter/receiver 130 on the airplane 203 in the position 203b to the point P1, and the dashed line along which the slant range $R_3$ is measured from the transmitter/receiver 130 on the airplane 203 in the position 203c to the point P1, corresponding to the start and finish of the subaperture 215, make an angle $\theta_2$.

SAR/ATI/STAP are performed. The entire subaperture 215 is used for SAR and ATI, as ATI is derived from two or more SAR images. STAP is performed, by the computer processor 110, as programmed by computer software stored in the computer memory 120, when the airplane 203 is at the beginning of the subaperture 215, i.e. at position 203b and when the airplane 203 is at the end of the subaperture, i.e. at position 203c This process is shown in detail in FIG. 3

For a target moving with constant velocity along a linear trajectory in the stripmap geometry, target slant range, $R_T(t)$ leading from the transmitter/receiver 130 on the airplane to the target location $P_2$ as a function of time is:

$$R_T(t)=\sqrt{(R_0+x_0 v_x t)^2+(y_0+(V_p v_y)-t)^2+H^2+} \quad (2)$$

where $(v_x,v_y)$ are the velocities in the x and y dimensions, respectively of the target. $R_1$, $R_2$, $R_3$, $R_4$ are equal to R(t) at a time when the airplane is at positions 203a, 203b, 203c, and 203d, respectively. Equations (1) and (2) may be different for geometries other than stripmap and for other forms of target motion (M. Soumekh, *Synthetic Aperture Radar Signal Processing with Matlab Algorithms*, Wiley, 1999; Ian G. Cumming and Frank H. Wong. *Digital Processing of Synthetic Aperture Radar Data: Algorithms and Implementation*. Artech House Publishers, January 2005.).

Figure 3:
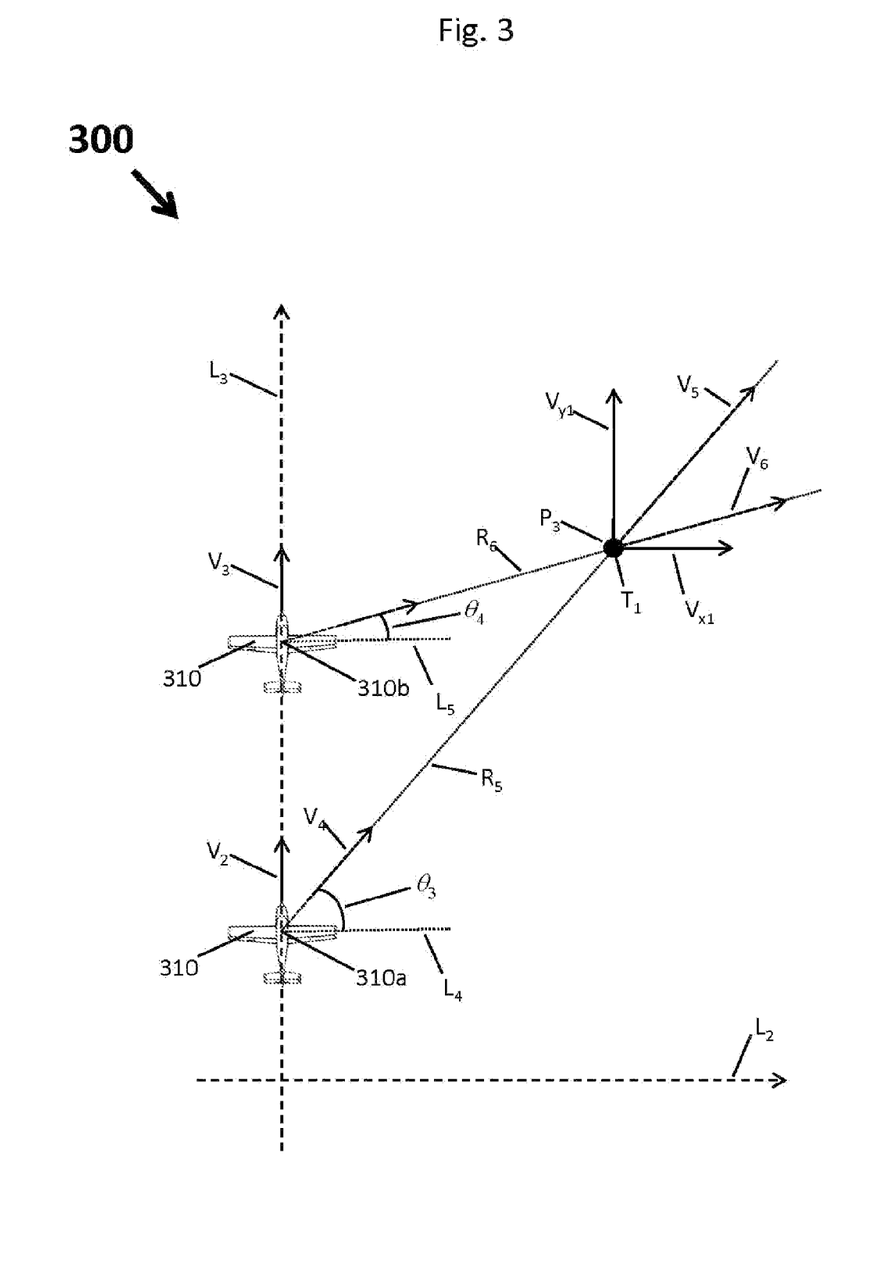
FIG. 3 illustrates a SAR/GMTI platform on an aircraft vehicle moving along a straight flight path, wherein the SAR/GMTI platform performs velocity estimation of a single moving target at two locations using STAP.

FIG. 3 illustrates a diagram 300. The diagram 300 shows an aircraft, airborne vehicle, or airplane 310, at a plurality of different locations to depict the flight of the airplane 310. The airplane 310 is shown at locations 310a and 310b in FIG. 3, at two different instances of time as the airplane 310 flies along a path L3. The airplane 310 flies with a velocity $V_2$, at the location of 310a, and there is a distance or slant range, $R_5$, between a transmitter/receiver, such as transmitter/receiver 130 of FIG. 1, which may be located on airplane 310 and the location $P_3$, when the platform is at the location 310a. A dashed line along which the distance or slant range $R_5$ is measured, makes an angle $\theta_3$ with a boresight line $L_4$, wherein the boresight line $L_4$ is the optical axis (look direction) of a directional antenna of the transmitter/receiver 130 on the airplane 310, when the airplane is at location 310a.

When the airplane 310 is at the location 310b, there is a distance $R_6$ between a transmitter/receiver, such as transmitter/receiver 130 on the airplane 310 and the location $P_3$. The dashed line along which $R_6$ is measured makes an angle of $\theta_4$ with respect to a boresight line $L_5$, wherein the boresight line $L_5$ is the optical axis of a directional antenna of the transmitter/receiver 130 on the airplane 310, when the airplane is at location 310b.

The airplane 310 files with a velocity of $V_3$ at the location 310b. A line $L_3$ shows the path (track) that the airborne vehicle 310 takes in FIG. 3. A line $L_2$, perpendicular to the line $L_3$, indicates the across-track dimensions. Velocities $V_2$ and $V_3$ are along-track velocities of the airborne vehicle 310 corresponding to locations 310a and 310b, respectively. $V_4$ represents the velocity of the airborne vehicle 310 along the dashed line along which the slant-range $R_5$ is measured. Point $P_3$ is a point in space at which a target $T_1$ is located. The target $T_1$, may be for example, an airborne vehicle, a land vehicle a sea vehicle or a dismount. The target $T_1$ has along- and across-track velocities $V_{y1}$ and $V_{x1}$, respectively. Velocities $V_5$ and $V_6$ represent target $T_1$ velocities along the dashed lines along which the slant ranges $R_5$ and $R_6$ are measured, respectively.

The diagram 300 depicts the SAR/GMTI platform locations (wherein the transmitter/receiver 130 is part of the SAR/GMTI platform) at locations 310a and 310b estimating the velocity of the moving target $T_1$ or airplane 310 in the stripmap collection geometry at two locations—location i or 310a, and location i+1 or 310b along a flight path or line $L_3$. Here a specific instance is illustrated while in practice the platform's flight path (i.e. the flight path of transmitter/receiver 130 on the airplane 310) may be different from $L_3$ as chosen appropriately for the mission requirements. It is also not necessary that a second measurement (useful data for STAP processing) be taken at a contiguous point to the first measurement; the second measurement may be made at some arbitrary location j. At both locations the platform or the location of transmitter/receiver 130 on the airplane 310, may have the same vector velocity $V_2$ and $V_3$. The flight path line $L_3$ is coincident with an x-axis of line $L_3$ and is perpendicular to a y-axis of line $L_2$. The lines $L_4$ and $L_5$ may correspond to platform (transmitter/receiver 130) boresights, i.e. optical axis of a directional antenna of the transmitter/receiver 130 on the airplane 310, when the airplane is at locations 310a and 310b, and defined as the direction normal to the heading of the platform, i.e. the lines $L_4$ and $L_5$ are parallel to the y-axis line $L_2$.

In FIG. 3, moving target $T_1$ has a constant x velocity shown by velocity $V_{x1}$ and a constant y velocity shown by velocity $V_{y1}$. At location i or 310a the platform or transmitter/receiver 130 collects data to compute the velocity $v_{ri}$ or velocity $V_5$ in FIG. 3, along the dashed line along which slant range $R_5$ is measured forming an angle $\theta_i$ shown by angle $\theta_3$ with boresight line $L_4$. This procedure is repeated at location i+1 or location 310b where the platform or the transmitter/receiver 130 of the airplane 310 collects data to compute velocity $v_{ri+1}$ shown by velocity $V_6$ along the dashed line along which the slant range $R_6$ is measured forming an angle $\theta_{i+1}$ shown by angle $\theta_4$ with boresight line $L_5$. Using STAP the estimated velocities are $(\hat{v}_i, \hat{v}_{i+1})$ and the estimated angles are $(\hat{\theta}_i, \hat{\theta}_{i+1})$.

There are many possible ways to implement velocity and angle-of-arrival estimation. STAP is one particular algorithm that uses spatial and temporal beamformers along with a clutter cancellation matrix in order to suppress unwanted information and to enhance the desired signal response. One example of a STAP implementation is described here (S. U. Pillai, K. Y. Li, and B. Himed, *Space Based Radar: Theory & Applications*. McGraw Hill Professional, December 2007). The spatial steering column vector is given by $$\underline{a}(\theta) = \left[1, e^{-j2\pi\frac{d\sin\theta}{\lambda}}, \ldots, e^{-j2\pi\frac{(N-1)d\sin\theta}{\lambda}}\right]^T, \quad (3)$$

where d is the spacing between the N sensor array elements, $\theta$ is the look angle and $\lambda$ is the wavelength corresponding to the transmitter center frequency. The temporal steering column vector is given by $$\underline{b}(v) = \left[1, e^{-j\pi\frac{4vT_r}{\lambda}}, e^{-j2\pi\frac{4vT_r}{\lambda}}, \ldots, e^{-j(M-1)\pi\frac{4vT_r}{\lambda}}\right]^T, \quad (4)$$

where v is the running variable for velocity (the search parameter) and $T_r$ is the transmitter's pulse repetition interval (PRI). In equations (3) and (4), the superscript $^T$ stands for the transpose operator. Since the space-time processing is performed simultaneously, the joint space-time steering vector can formed by taking the Kronecker product between the temporal and spatial steering vectors as $$s(\theta, v) = \underline{b}(v)\underline{a}(\theta \otimes) \quad (5)$$

The joint space-time steering vector may be directly applied to the spatio-temporal data vector $\underline{x}$ if clutter suppression is either unwarranted or undesired. Otherwise, a weight vector containing the inverse of the clutter covariance matrix R can be formed as $$w = R^{-1}s(\theta, v) \quad (6)$$

which is the joint space-time matched filter vector, and when applied to the data vector $\underline{x}$ in the following manner $$P_c = |w^*\underline{x}|^2, \quad (7)$$

suppresses clutter and generates the desired adaptive output $P_c$. In equation (7), the superscript * stands for the complex conjugate transpose operator.

At each platform location (such as 310a and 310b) the projection of the platform velocity $v_{pi} = V_p \sin\theta_i$ and $v_{pi+1} = V_p \sin\theta_{i+1}$ must be removed from the measured velocities along the dashed lines along which slant ranges $R_5$ and $R_6$ are measured in order to obtain the correct estimate for the target velocities projected along the look angles. Then the velocities $v_{ri}$ and $v_{ri+1}$ can be written as projections of true velocity $(v_x, v_y)$ of the target $T_1$ of FIG. 3, as $$v_{ri} = v_x \cos\theta_i + v_y \sin\theta_i$$

$$v_{ri+1} = v_x \cos\theta_{i+1} + v_y \sin\theta_{i+1} \quad (8)$$

Using these equations, estimates for the true velocity of the target $T_1$ can be obtained by solving for $v_x$ and $v_y$ in (8) as $$\hat{v}_x = \frac{v_{ri}\sin\theta_{i+1} - v_{ri+1}\sin\theta_i}{\sin\theta_i\sin\theta_{i+1}(\cot\theta_i - \cot\theta_{i+1})} \quad (9)$$

$$\hat{v}_y = \frac{v_{ri}\cos\theta_{i+1} - v_{ri+1}\cos\theta_i}{\cos\theta_i\cos\theta_{i+1}(\tan\theta_i - \tan\theta_{i+1})}.$$

Figure 4:
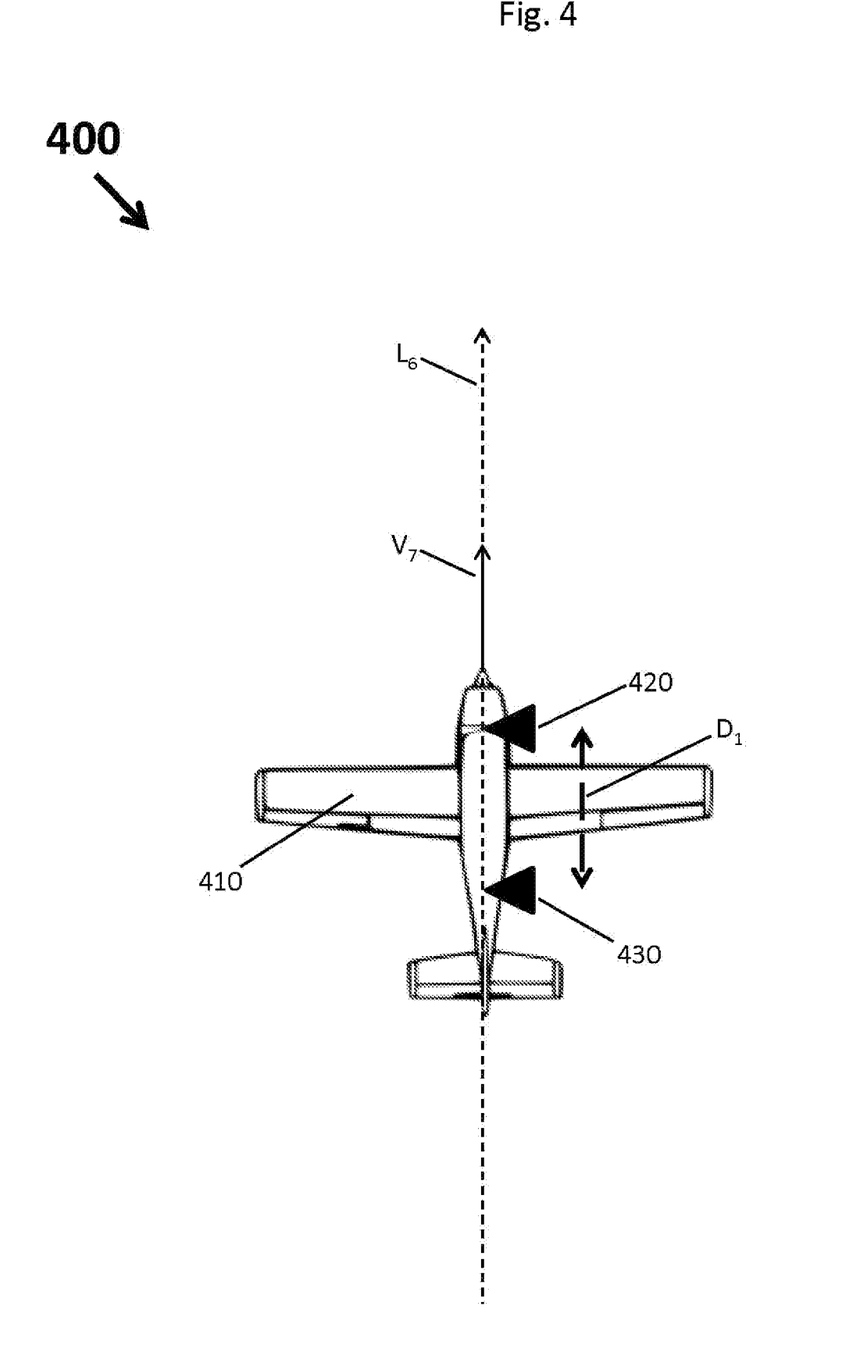
FIG. 4 illustrates an aircraft vehicle with a transmitter/receiver mounted on the aircraft vehicle.

FIG. 4 illustrates a diagram 400 shows an airborne vehicle or a airplane 410 moving with velocity $V_7$ along a flight path $L_6$ having two sets of sensors (phase centers) marked 420 and 430. Each set of sensors may include a transmitter/receiver 130 and each transmitter/receiver 130 may include a group of sensors that can be used for both transmitting and/or receiving electromagnetic signals such as radar signals. The two sensor sets of 420 and 430 are separated by a typical distance $D_1$. In traditional along track interferometry (ATI), two separate synthetic aperture radar (SAR) images are generated by the sensor groups (such as 420 and 430) and a pixel by pixel interferogram is generated to form an ATI image as executed by a computer processor such as 110 and which may be stored in a computer memory, such as computer memory 120.

Figure 5:
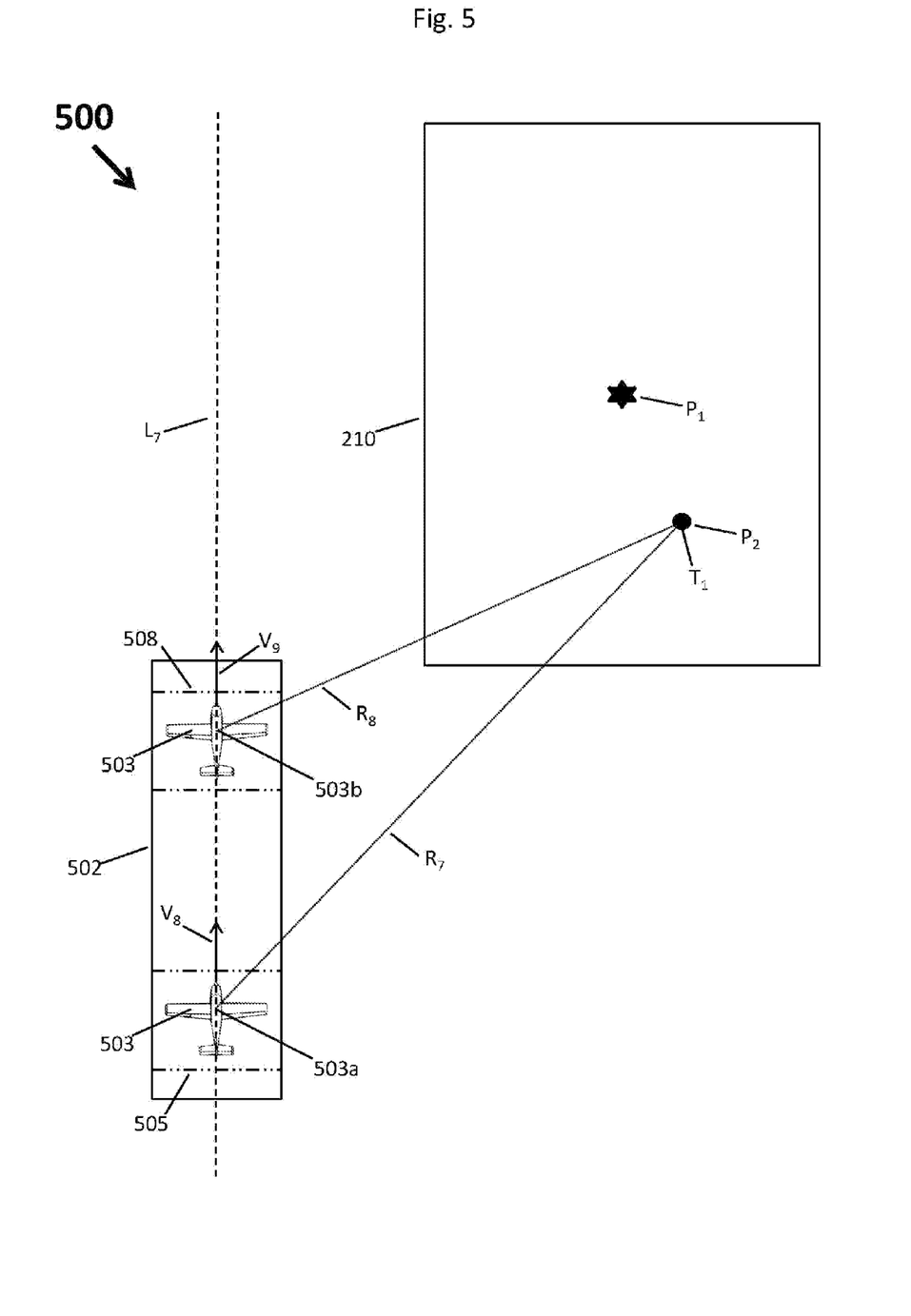
FIG. 5 illustrates regions of a subaperture, through which an aircraft vehicle flies, and over which the three types of processing: SAR, ATI and STAP, are performed, in accordance with an embodiment of the present invention.

FIG. 5 illustrates a diagram 500 of a single subaperture 502 along a larger tracking aperture. A scene being imaged 210 has center point (aim point) $P_1$, with a single point target $T_1$ located at point $P_2$ in the scene 210 shown for reference. A platform, such as the transmitter/receiver 130 on the airplane 503 is shown at two locations 503a and 503b along the flight path $L_7$ at the beginning of the subaperture 505 with slant range $R_7$ to point $P_2$ at which the target $T_1$ is located and at the end of the subaperture 508 with slant range $R_8$ to the point $P_2$ at which the target $T_1$ is located. SAR and ATI are performed, by the computer processor 110 as programmed by computer software stored in the computer memory 120, over the entire subaperture 502 while STAP is performed at least twice, once may be at the beginning of the subaperture 502 indicated with box 505 and once may be at the end of the subaperture 502 indicated with box 508. Spacing between the STAP CPIs must be chosen appropriate enough to ensure that the two (or more) velocity and angle estimates are sufficient for providing an accurate estimate of the target's velocity and heading provided that the subaperture 502 length is chosen appropriately.

SAR imaging is performed on the data collected by a minimum of two phase centers of transmitter/receivers 130 or sets of sensors separated by a distance $D_1$ in the along-track dimension, as shown in FIG. 4. In order to form an image from the measured data, an image formation method such as the range-Doppler method, backprojection, chirp scaling, etc. is typically applied by a computer processor, such as a computer processor 110 as programmed by a computer software program stored on computer memory 120 and the image formed may be stored or data specifying, defining or referring to the image formed may be stored in computer memory 120 and/or displayed on a computer display, such as 150. One such method for image formation, the backprojection method (L. A. Gorham and L. J. Moore., *SAR image formation toolbox for MATLAB*, In Algorithms for Synthetic Aperture Radar Imagery XVII 669, 2010.), forms the image by applying a 2D matched filter to the data.

Using a simple model for the reflected signal we can quantify the form of the 2D matched filter, to be employed by computer processor 110, required for image formation using the backprojection method. The model for the measured data is $$s(\tau,t) = \sigma_k f\left(\tau - 2\frac{R_k(t)}{c}\right)\exp\left(-j2\pi f_0\left(\tau - 2\frac{R_k(t)}{c}\right)\right) \quad (10)$$

where $\tau$ is the fast-time index, t is the slow-time index, $\sigma_k$ is the complex scattering coefficient of the $k^{th}$ target, $f(\tau)$ is the transmit signal, $R_k(t)$ is the instantaneous slant range to the $k^{th}$ target, c is the wave propagation speed in free space and $f_0$ is the carrier frequency. Then the 2D matched filter, executed by computer processor 110, as programmed by computer software stored in computer memory 120, can be written compactly in the frequency domain as $$H(\omega,t) = F^*(\omega)\exp(j2\omega R_i(t)/c) \quad (11)$$

where $R_i(t)$ is the instantaneous slant range corresponding to the point being imaged.

Referring to FIG. 3, once the SAR processing has been done, by the computer processor 110, for each of the two sets of collected data on sensors 420 and 430, an interferogram is formed by the computer processor 110 computing the zero-lag correlation pixel-by-pixel between the two images $$I_A(x,y)I^*_B(x,y) = M(x,y)e^{j\phi(x,y)} \quad (12)$$

where $I_A(x,y)$ is the image from the first phase center (labeled A) 420 and $I_B(x,y)$ is the image from the second phase center (labeled B) 430 and (•)* denotes the complex conjugate. Here we apply a two-level threshold, one on the magnitude of the interferogram $M(x, y)$ and one on the phase of the interferogram $\phi(x, y)$ (Y. Zhang, *Along Track Interferometry Synthetic Aperture Radar* (ATI-SAR) *Techniques for Ground Moving Target Detection*." Final Technical Report AFRL-SN-RS-TR-2005-410, January 2006.). The interferogram or characteristics or data referring to the interferogram may be stored in the computer memory 120 by the computer processor 110 in accordance with one or more embodiments of the present invention.

The first threshold on the magnitude aids in suppressing the unwanted phase signature of irrelevant pixels in the image, as only the pixels that fall above the threshold are considered when examining the phase. The second threshold on the phase determines the presence and thereby the location of the moving target's signature. By examining the value of the phase of those pixels that are determined to correspond to a moving target an estimate for the velocity might also be obtained, by the computer processor 110, as $$\hat{v}_r = \frac{\phi\lambda V_p}{4\pi\Delta} \quad (13)$$

where $\Delta$ or $D_1$ is the along-track separation of the two phase centers from which the images were obtained (R. M. Kapfer and M. E. Davis, *Ultra-Wideband Multi-Mode Radar Processing*, Proceedings of the 2012 IEEE Radar Conference, Atlanta, Ga. May 7-11).

Figure 6:
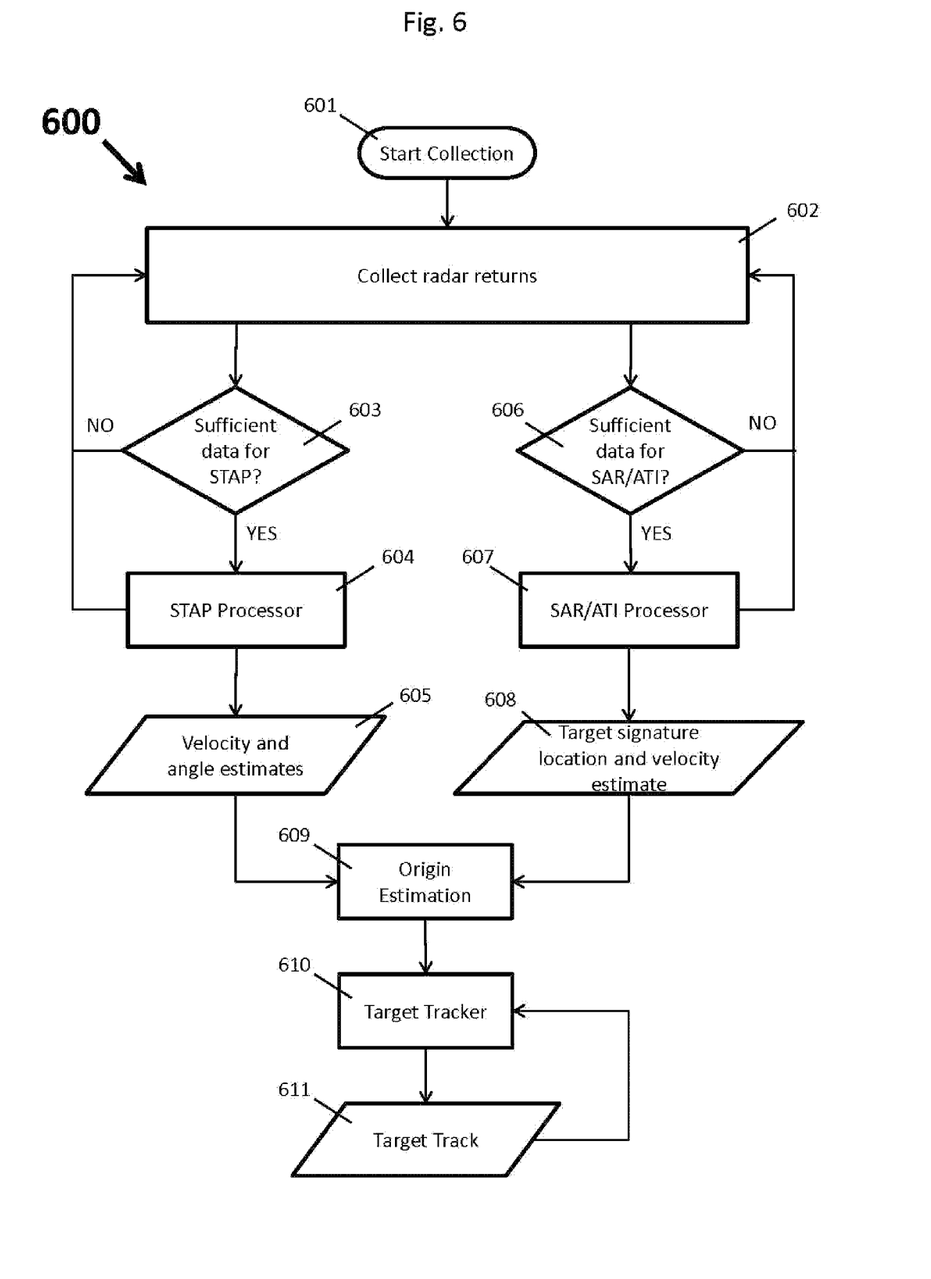
FIG. 6 is a flowchart of routines and/or methods that can be implemented on a computer processor programmed by computer software, wherein the routines enable the detection, velocity estimation and tracking of a moving target.

FIG. 6 shows a flow chart 600, of an embodiment of the present invention which may be implemented by the computer processor 110 of a computer device, wherein the computer processor 110 may include or may be a FPGA (field-programmable gate array (FDGA), and/or a GPU (graphics processing unit), and which may be on the ground station 160 and also may be located in a platform or transmitter/receiver 130 onboard the airplane 203. At step 601, hardware for data collecting (radar) is set up by the computer processor 110 with collection parameters and a process start. At step 602, the computer processor 110 is programmed to cause a sensor or sensor array of the transmitter/receiver 130 to collect radar returns and send them to the computer processor 110, which may be or which may include an on board computer processor, on board the airplane 203, or transmit to a ground station 160 for ground station computer processors for further processing. At step 602 the computer processor 110 may cause a first receiver device and a second receiver device, and any number of further receiver devices of the transmitter/receiver 130 to receive first, second, and any further number of sets of pulse returns, respectively, as referred to by FIG. 8, step 804. The computer processor 110 may determine first, second, and any further number of sets of data from the first, second, and any further number of sets of pulse returns, corresponding to the first, second, and any further number of receiver devices. The computer processor may store the first, second, and any further number of sets of pulse returns in computer memory 120, may perform processing on the sets of pulse returns and store the first, second, and further sets of data in computer memory 120.

At step 603, in at least one embodiment, the computer processor 110 is programmed by computer software to determine if collected radar returns are sufficient for STAP processing. Whether they are sufficient may be based on any known criteria, such as user defined CPI for STAP. If the answer is no, the computer processor 110 does not change the state and continues collecting radar returns or sets of pulse returns and determining sets of data, using first and second receiver devices (and any further number of receiver devices) of transmitter/receiver 130 at step 602. If the answer is yes, the computer processor 110 takes a subset of the pulse returns and passes this subset of the first and second pluralities of data items to the STAP processor 604 (or processing 814 in FIG. 8), which may be part of the computer processor 110, which is explained as in FIG. 3. The STAP processor 604 may be implemented by a computer processor of a computer device which may be part of the ground station 160 or located at the platform on the airplane 203 as part of the computer processor 110. Simultaneously with the step 603, at step 606, the computer processor 110, in at least one embodiment, determines if collected radar returns and/or sets of data are sufficient for SAR/ATI processing. Whether they are sufficient may be based on any known criteria, such as user defined CPI (subaperture) for SAR. Once the appropriate amount of data has been collected by the computer processor 110 via the transmitter/receiver 130 the data is typically partitioned into first and second pluralities of data items and is sent to the SAR/ATI processor 607 (or step 810 of FIG. 8), which may be part of the computer processor 110. The outputs from this stage 604 and 607 yields the velocity and angle estimates at step 605 (or called first and second sets of second modified plurality of data items at step 814) from the STAP processor 604 and SAR images, moving target signature location, and velocity estimate 608 (or called first and second sets of second modified plurality of data items) from the SAR/ATI processor 607. These outputs 605 and 608 are then sent to the target origin estimator 609, which may be part of the computer processor 110, simultaneously, for the given subaperture, such as subaperture 215, in order to produce a new node for the target tracker 610, which may be part of the computer processor 110. The origin estimator 609, which may be part of the computer processor 110, combines the data for an image and each of the first and second set of second modified plurality of data items to determine a plurality of positions, one for each of the plurality of targets. The output, or the plurality of positions of the plurality of targets from the target origin estimator 609 are then sent to the target tracker, which may be part of the computer processor 110 at step 610 which outputs and monitors the target track at step 611. The target track, such as a track of target $T_1$ in FIG. 3, may be monitored by the apparatus 100, such as including by transmitter/receiver 130 and computer processor 110.

Figure 7:
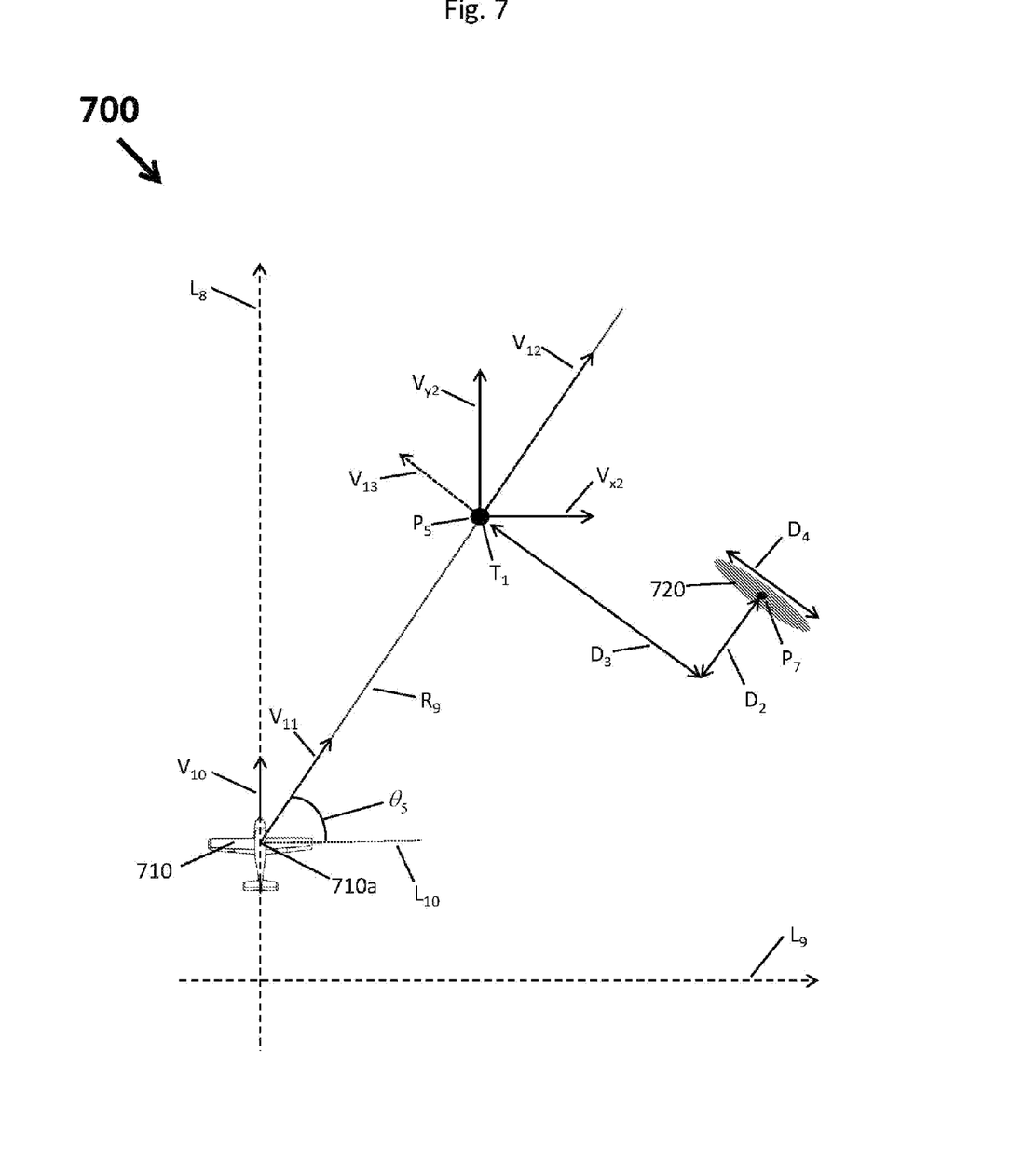
FIG. 7 illustrates an aircraft during the process of target origin estimation (geolocationing) using ATI and STAP outputs.

FIG. 7 illustrates a diagram 700 of the origin estimation process 609 indicated in FIG. 6. FIG. 7 shows an airplane 710 at a location 710a. Radar data which is collected by the computer processor 110, through the transmitter/receiver 130, over the entire subaperture, such as subaperture 215, is used for ATI processing by the computer processor 110, for detecting the moving targets signature 720 of target $T_1$. The two STAP subapertures such as 505 and 508 are used for STAP for velocity and angle estimations (at least two locations are necessary but can be performed at multiple locations for a more accurate result). A point target $T_1$ located at position $P_5$ at location $(x_T, y_T)$, moving with velocity vectors $V_{x2}$ and $V_{y2}$, is formed as moving target signature 720 around the signature origin $P_7$ $(x_s, y_s)$ after SAR and ATI processing. Moving target signature 720 may be shifted in range $\Delta_r$ $D_2$, shifted in cross-range $\Delta_a$ $D_3$ and also smeared in cross-range $\Delta_s, D_4$ The length of the shifts and smears are defined as (Fienup, J. R. (2001). Detecting moving targets in SAR imagery by focusing. IEEE Transactions On Aerospace And Electronic Systems 37, 794-809.).

$$\Delta_r = -\frac{1}{2}v_r T \tag{14}$$

$$\Delta_a = \frac{v_r T}{\Delta \theta_a}\left[\frac{1}{2} - v_a T\right] \tag{15}$$

$$\Delta_s = 2v_a T \tag{16}$$

where $v_r = V_{12}$ and $v_a = V_{13}$ are the projections of the target velocity vectors $V_{x2}$ and $V_{y2}$ for the target $T_1$, over the direction of the line along which slant range $R_9$ is measured and the direction along which cross range direction is measured respectively (The lines along which cross-range and slant-range are measured are always perpendicular to each other). The mean of the two STAP angle estimations, in at least one embodiment, is used by the computer processor 110 to determine the slant range direction $R_9$ towards the origin $P_5$ of the target $T_1$ forming the angle $\theta_5$ with boresight $L_{10}$ of an antenna of transmitter/receiver 130 when the airplane 710 is located at location 710a. Target geo-location $(\hat{x}_T, \hat{y}_T)$ can be estimated by using the formula $$\begin{bmatrix}\hat{x}_T \\ \hat{y}_T\end{bmatrix} = \begin{bmatrix}x_s \\ y_s\end{bmatrix} + \begin{bmatrix}\cos\theta & -\sin\theta \\ \sin\theta & \cos\theta\end{bmatrix}\begin{bmatrix}\Delta_a \\ \Delta_r\end{bmatrix}. \tag{17}$$

Figure 8:
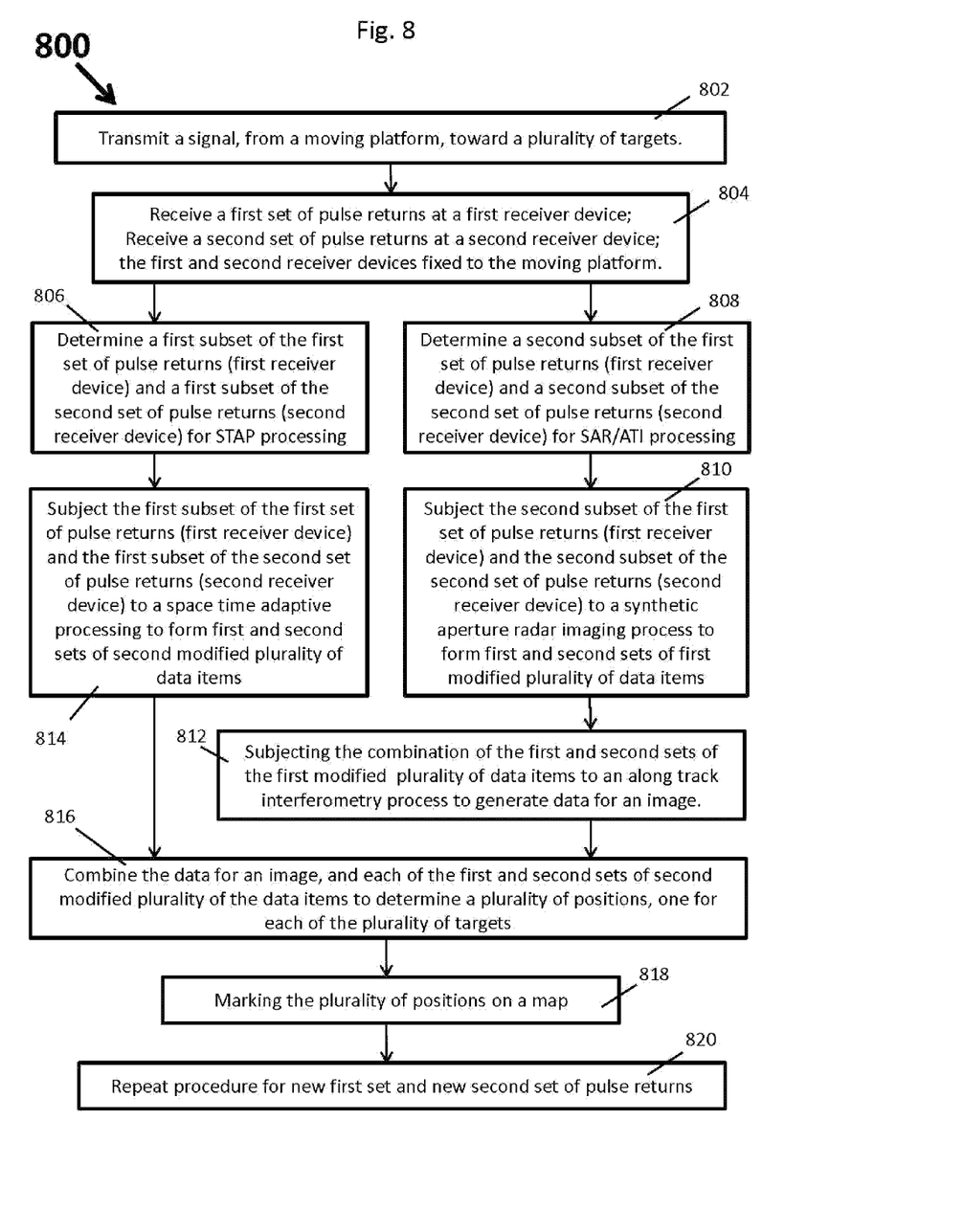
FIG. 8 shows a flow chart of a method in accordance with another embodiment of the present invention.

FIG. 8 shows a flow chart 800 of a method in accordance with another embodiment of the present invention. At step 802 a signal is transmitted from a moving platform toward a plurality of targets. For example, a signal may be transmitted from transmitter/receiver 130 from apparatus 100, which may be or may be part of a moving platform. The computer processor 110 may cause the transmitter/receiver 130 to transmit the signal at step 802, in response to a computer program stored in computer memory 120.

At step 804 a first set of pulse returns, in response to the signal transmitted at step 802, may be received at a first receiver device, which may be part of the transmitter/receiver 130. In addition a second set of pulse returns, in response to the signal transmitted at step 802, may be received at a second receiver device, which may be part of the transmitter/receiver 130. The first set of pulse returns may be received by the first receiver device at the same time, or substantially at the same time, that the second set of pulse returns are received by the second receiver device. The difference between the first set of pulse returns and the second set of pulse returns may be due in part to the difference in location of the first receiver device and the second receiver device. Although a first receiver device and a second receiver device are referred to, one or more further receiver devices may be used to receive one or more further sets of pulse returns in accordance with other embodiments of the present invention, and two receiver devices are given as a simplified example.

At step 806, the computer processor 110 may be programmed by computer software in computer memory 120 to determine a first subset of the first set of pulse returns (first receiver device) that will be used for STAP processing at step 814. The first subset of the first set of pulse returns (first receiver device) may be all of the first set of pulse returns or somewhat less than all of the first set of pulse returns. For example, if there were one hundred pulse returns in the first set of pulse returns, only ten consecutive pulse returns may be needed to perform STAP processing at step 814. Thus, for example, the first through the tenth pulse returns (out of the one hundred pulse returns of the first set of pulse returns, in this example), may be used as the first subset of the first set of pulse returns, in one embodiment to perform STAP processing at step 814. The number of pulse returns of the first set of pulse returns (first receiver device) needed for the STAP processing may be stored in the computer memory 120 and the first subset of the first set of pulse returns may be separated out from the rest of the first set of pulse returns by the computer processor 110 and/or identified and/or stored separately from the rest of the first set of pulse returns in computer memory 120 by the computer processor 110.

Similarly, the computer processor 110 may be programmed to determine a first subset of the second set of pulse returns (second receiver device) that will be used for STAP processing at step 814 (for the second receiver device). As an example, if there were one hundred pulse returns in the second set of pulse returns, only ten consecutive pulse returns may be needed to perform STAP processing at step 814 (for the second receiver device). Thus, for example, the first through the tenth pulse returns (out of the one hundred pulse returns of the second set of pulse returns, in this example), may be used as the first subset of the second set of pulse returns (second receiver device) in one embodiment to perform STAP processing at step 814. The number of pulse returns needed for the STAP processing (for the second receiver device) may be stored in the computer memory 120, and the first subset of the second set of pulse returns may be separated out from the rest of the second set of pulse returns by the computer processor 110 and identified and stored in computer memory 120 separately from the rest of the second set of pulse returns (second receiver device).

For the SAR processing of steps 808 and 810, and/or the ATI processing of step 812, a different number of pulse returns may be needed as compared to the STAP processing of step 814. For example, if there were one hundred pulse returns in the first set of pulse returns (first receiver device), fifty consecutive pulse returns may be needed to perform SAR processing at steps 808 and 810, and ATI processing at step 812. Thus, for example, the first through the fiftieth pulse returns (out of the one hundred pulse returns of the first set of pulse returns, in this example), may be used as a second subset of the first set of pulse returns (first receiver device) in one embodiment to perform SAR and ATI processing at steps 808, 810, and 812. The number of pulse returns needed for the SAR and ATI processing may be stored in the computer memory 120, and the second subset of the first set of pulse returns (first receiver device) may be separated out from the rest of the first set of pulse returns by the computer processor 110 and identified and stored in computer memory 120 separately from the rest of the first set of pulse returns (first receiver device).

Similarly, if there were one hundred pulse returns in the second set of pulse returns (second receiver device), fifty consecutive pulse returns may be needed to perform SAR processing at steps 808 and 810, and ATI processing at step 812. Thus, for example, the first through the fiftieth pulse returns (out of the one hundred pulse returns of the second set of pulse returns, in this example), may be used as a second subset of the second set of pulse returns (second receiver device) in one embodiment to perform SAR and ATI processing at steps 808, 810 and 812. The number of pulse returns needed for the SAR and ATI processing may be stored in the computer memory 120, and the second subset of the second set of pulse returns (second receiver device) may be separated out from the rest of the second set of pulse returns by the computer processor 110 and identified and stored in computer memory 120 separately from the rest of the second set of pulse returns (second receiver device).

At step 810, each of the second subsets of the first and the second sets of pulse returns, respectively, is subjected to a synthetic aperture radar imaging process by the computer processor 110 to form first and second sets of first modified plurality of data items, which are stored in computer memory 120. The synthetic aperture radar imaging process of step 810 may be any synthetic aperture radar imaging process, also referred to in the art as a SAR process and referred to in step 607 of FIG. 6 and as known in the art. Such SAR processes may include one or more of different well known methods such as "Backprojection", "range-Doppler imaging", "2D (two dimensional)-matched filtering" as are known in the art.

At step 812, a combination of the first and second sets of the first modified plurality of data items are subject to an along track interferometry process by the computer processor 110 to generate data for an image, which may be stored in computer memory 120. The along track interferometry process of step 812, and referred to as ATI process in step 607 of FIG. 6, may be any ATI process well known in the art.

At step 814, each of the first subsets of the first and second sets of pulse returns from 806 are subject to space time adaptive processing (STAP) by the computer processor 110 to form first and second sets of a second modified plurality of data items, which are stored in computer memory 120. The STAP method referred to in step 814 and in step 604 of FIG. 6 may be any STAP process known in the art.

At step 816, in at least one embodiment, the data for an image, is combined with the first and the second sets of modified plurality of data items to determine a plurality of positions, one each for the plurality of targets as explained in FIG. 7 by the computer processor 110 to determine a plurality of positions, one for each of the plurality of targets, and these plurality of positions are stored in computer memory 120.

At step 818, the plurality of positions are marked on a map by the computer processor 110, such as by being displayed on a computer screen with a geographical map on the computer display 150 on the moving platform of apparatus 100, or on some other computer display.

At step 820, the procedure may loop back to step 804, with a new first set and a new second set of pulse returns (for the first and the second receiver devices, respectively) being received and thus replacing the old first set and second set of pulse returns. The procedure may be repeated for a plurality of first sets and a plurality of second sets of pulse returns (for the first and the second receiver devices, respectively), with the transmitter/receiver 130 continuously transmitting the signal. In addition the procedure of FIG. 8 may be repeated for a plurality of further receiver devices in addition to the first and the second receivers.

The transmitter/receiver 130 may include a plurality of receiver devices, such as a first receiver device and a second receiver device referred to for the method of FIG. 8. Each of the plurality of receiver devices may be located in a different location on the same moving platform from each of the other of the plurality of receiver devices. Each receiver device of the plurality of receiver devices of the transmitter/receiver 130 may includes a plurality of sensors.

The computer processor 110 may mark and/or display on a computer display, such as computer display 150, the plurality of positions sequentially to identify a track for each of the plurality of targets.

The apparatus 100 may be a moving platform, or may be fixed to a moving platform, and that moving platform may be fixed to an airborne vehicle, such as an airplane or a helicopter. The moving platform may also be fixed to an underwater submerged vehicle, such as a submarine, a space based vehicle, such as a rocket or the space shuttle.

Each of the plurality of moving targets, referred to in FIG. 8, may be ground based, air based or a combination of ground based or air based in one or more embodiments.

We claim:

1. A method comprising
transmitting a signal in the form of pulses from a moving platform towards a plurality of moving targets during a duration;
receiving at a first receiver device a first set of pulse returns back from the plurality of moving targets in response to the signal, wherein the first receiver device is fixed to the moving platform;
receiving at a second receiver device a second set of pulse returns back from the plurality of moving targets in response to the signal, wherein the second receiver device is fixed to the moving platform;
determining a first subset of the first set of pulse returns;
determining a first subset of the second set of pulse returns;
determining a second subset of the first set of pulse returns;
determining a second subset of the second set of pulse returns;
subjecting the second subset of the first set of pulse returns to a synthetic aperture radar imaging process to form a first set of a first modified plurality of data items;
subjecting the second subset of the second set of pulse returns to a synthetic aperture radar imaging process to form a second set of a first modified plurality of data items;
subjecting the combination of the first set and second set of the first modified plurality of data items to an along track interferometry process to form data for an image;
subjecting the first subset of the first set of pulse returns to a space time adaptive processing to form a first set of a second modified plurality of data items;
subjecting the first subset of the second set of pulse returns to a space time adaptive processing to form a second set of a second modified plurality of data items; and
combining the data for the image and the first and the second sets of second modified plurality of data items to determine a plurality of positions one for each of the plurality of targets
marking the plurality of positions, for each of the plurality of moving targets, on a map.

2. The method of claim 1 wherein
the first receiver device includes a plurality of sensors; and
the second receiver device includes a plurality of sensors.

3. The method of claim 1 wherein
the plurality of positions, for each of the plurality of targets, are marked sequentially on a map to identify a track for each of the plurality of targets.

4. The method of claim 1 wherein
the moving platform is fixed to an airborne vehicle.

5. The method of claim 1 wherein
the moving platform is fixed to an underwater submerged vehicle.

6. The method of claim 1 wherein
the moving platform is fixed to a space based vehicle.

7. The method of claim 1 wherein
each of the plurality of moving targets is ground based.

8. The method of claim 1 wherein
each of the plurality of moving targets is air based.

9. The method of claim 1 wherein
each of the plurality of moving targets is underwater based.

10. The method of claim 1 wherein
each of the plurality of moving targets is space based.

11. The method of claim 1 wherein
the first set of pulse returns are received by the first receiver device at substantially the same time that the second set of pulse returns are received by the second receiver device.

12. An apparatus comprising
a transmitter/receiver including a transmitter, a first receiver device, and a second receiver device;
a computer processor;
and a computer memory;
wherein the computer processor is programmed by computer software stored in the computer memory to cause the transmitter/receiver to transmit a signal in the form of pulses from a moving platform towards a plurality of moving targets during a duration;
wherein the computer processor is programmed by computer software stored in the computer memory to receive at the first receiver device a first set of pulse returns back from the plurality of moving targets in response to the signal, wherein the first receiver device is fixed to the moving platform;
wherein the computer processor is programmed by computer software stored in the computer memory to receive at the second receiver device a second set of pulse returns back from the plurality of moving targets in response to the signal, wherein the second receiver device is fixed to the moving platform;
wherein the computer processor is programmed by computer software stored in the computer memory to determine a first subset of the first set of pulse returns;
wherein the computer processor is programmed by computer software stored in the computer memory to determine a first subset of the second set of pulse returns;
wherein the computer processor is programmed by computer software stored in the computer memory to determine a second subset of the first set of pulse returns;

wherein the computer processor is programmed by computer software stored in the computer memory to determine a second subset of the second set of pulse returns;

wherein the computer processor is programmed by computer software stored in the computer memory to subject the second subset of the first set of pulse returns to a synthetic aperture radar imaging process to form a first set of a first modified plurality of data items;

wherein the computer processor is programmed by computer software stored in the computer memory to subject the second subset of the second set of pulse returns to a synthetic aperture radar imaging process to form a second set of a first modified plurality of data items;

wherein the computer processor is programmed by computer software stored in the computer memory to subject the combination of the first set and second set of the first modified plurality of data items to an along track interferometry process to form data for an image;

wherein the computer processor is programmed by computer software stored in the computer memory to subject the first subset of the first set of pulse returns to a space time adaptive processing to form a first set of a second modified plurality of data items;

wherein the computer processor is programmed by computer software stored in the computer memory to subject the first subset of the second set of pulse returns to a space time adaptive processing to form a second set of a second modified plurality of data items; and wherein the computer processor is programmed by computer software stored in the computer memory to combine the data for the image and the first and the second sets of second modified plurality of data items to determine a plurality of positions one for each of the plurality of moving targets; and wherein the computer processor is programmed to mark the plurality of positions, for each of the plurality of moving targets, on a map.

13. The apparatus of claim 12 wherein
the first receiver device includes a plurality of sensors; and
the second receiver device includes a plurality of sensors.

14. The apparatus of claim 12 wherein
the plurality of positions, for each of the plurality of targets, are marked sequentially on a map, by the computer processor, to identify a track for each of the plurality of targets.

15. The apparatus of claim 12 wherein
the moving platform is fixed to an airborne vehicle.

16. The apparatus of claim 12 wherein
the moving platform is fixed to an underwater submerged vehicle.

17. The apparatus of claim 12 wherein
the moving platform is fixed to a space based vehicle.

18. The apparatus of claim 12 wherein
each of the plurality of moving targets is ground based.

19. The apparatus of claim 12 wherein
each of the plurality of moving targets is air based.

20. The apparatus of claim 12 wherein
each of the plurality of moving targets is underwater based.

21. The apparatus of claim 12 wherein
each of the plurality of moving targets is space based.

22. The apparatus of claim 12 wherein
the first set of pulse returns are received by the first receiver device at substantially the same time that the second set of pulse returns are received by the second receiver device.

* * * * *